(12) United States Patent
Weakly et al.

(10) Patent No.: US 7,476,300 B2
(45) Date of Patent: Jan. 13, 2009

(54) PROCESS FOR EXTRACTING AND RECOVERING METALS FROM AQUEOUS SOLUTIONS

(75) Inventors: Edward C. Weakly, Morrison, CO (US); Joseph N. Ignat, Cheyenne, WY (US); Henry L. DiCamillo, Pahrump, NV (US)

(73) Assignee: Hydro-Met of Colorado, Inc., Littleton, CO (US)

( * ) Notice: Subject to any disclaimer, the term of this patent is extended or adjusted under 35 U.S.C. 154(b) by 845 days.

(21) Appl. No.: 10/752,220

(22) Filed: Jan. 6, 2004

(65) Prior Publication Data

US 2004/0195112 A1    Oct. 7, 2004

Related U.S. Application Data

(60) Division of application No. 09/920,453, filed on Jul. 31, 2001, now Pat. No. 6,673,321, which is a continuation-in-part of application No. 09/248,064, filed on Feb. 10, 1999, now Pat. No. 6,267,871.

(60) Provisional application No. 60/238,099, filed on Oct. 4, 2000.

(51) Int. Cl.
  *B01J 19/08*    (2006.01)

(52) U.S. Cl. .......... 204/164; 204/671; 210/748
(58) Field of Classification Search ............ 204/164, 204/671; 210/748
  See application file for complete search history.

(56) References Cited

U.S. PATENT DOCUMENTS

| | | | | |
|---|---|---|---|---|
| 3,585,122 A | * | 6/1971 | King | 204/666 |
| 5,681,457 A | * | 10/1997 | Mahoney | 210/198.1 |
| 6,332,960 B1 | * | 12/2001 | Monteith | 210/748 |

* cited by examiner

*Primary Examiner*—Kishor Mayekar
(74) *Attorney, Agent, or Firm*—Cochran Freund & Young LLC; James R. Young

(57) ABSTRACT

An apparatus and process for recovering metals from aqueous solutions by passing an aqueous solution, which contains dissolved metals, into a space between two elongated electrodes of a treatment chamber. A very high voltage electric field is created in the treatment chamber and is accompanied by a very small trickle current charge to enhance adsorption, polarization, ion exchange or to otherwise agglomerate the dissolved metal, which is then recovered by filtering, adsorbing, exchanging or otherwise separating the metal from the water.

18 Claims, 5 Drawing Sheets

PROCESS FOR EXTRACTING AND RECOVERING METALS FROM AQUEOUS SOLUTIONS

CROSS REFERENCE TO RELATED PATENT APPLICATION

This patent application is a divisional of U.S. patent application Ser. No. 09/920,453, filed in the U.S. Patent and Trademark Office on Jul. 31, 2001, now U.S. Pat. No. 6,673,321, which is a continuation-in-part of U.S. patent application Ser. No. 09/248,064, filed in the U.S. Patent and Trademark Office on Feb. 10, 1999, now U.S. Pat. No. 6,267,871, and which is based on U.S. provisional patent application Ser. No. 60/238,099, filed on Oct. 4, 2000.

BACKGROUND OF THE INVENTION

1. Field of the Invention

This invention relates generally to the field of water purification, and more specifically to an apparatus and process for recovering metals from aqueous solutions by passing an aqueous solution, which contains dissolved metals (e.g., gold, silver, iron, aluminum, platinum, uranium, etc.) through a very high voltage electric field accompanied by a very small trickle current charge to enhance adsorption, polarization, ion exchange or otherwise agglomerate the metal and then, filtering, adsorbing, exchanging or otherwise separating the metal from the water.

2. State of the Prior Art

The removal of impurities and contaminants, including dissolved metals, from water has long been an important issue due to both environmental and public health concerns, and there are industrial interests in processes for capturing and recovering dissolved metals from aqueous solutions. Many devices and processes have thus been designed to treat contaminated water in order to make it safe for consumption or other public use. Metals of all types (e.g., gold, silver, iron, aluminum, platinum, uranium, selenium, and arsenic, etc.) dissolved or suspended in water comprise one such category of impurities, and commonly end up in the effluent wastewater of mining, city water discharge or other industrial operations including, most recently, from the semiconductor industry, as well as from many other industrial processes, commercial products, and natural sources, such as soils and groundwater aquifers. There are many known processes for removing metals from an aqueous solution. For example, electrodeposition processes, in which suspended or dissolved metals in an electrolyte are deposited onto an electrode by electrolysis are common. However, these known electrodeposition processes become very inefficient and cease to be cost effective when applied to aqueous solutions containing low concentrations of metals, which is often the case, especially in environmental clean-up and water purification applications. There are other processes for removing metals from aqueous solutions, such as chemical reactions to precipitate compounds, use of flocculents, adhesion to activated carbons and other materials, and the like, but such processes are also expensive, require substantial quality controls, and have their own recovery and disposal problems.

SUMMARY OF THE INVENTION

Accordingly, a general object of this invention is to provide a more economical process and apparatus for removing or recovering metals from aqueous solutions, particularly those aqueous solutions having low concentrations of the metals.

A more specific object of this invention is to treat an aqueous solution comprising dissolved and/or suspended metals in a manner that enhances removal of the metals by filtration and/or adsorption.

It is also an object of this invention to provide a process and apparatus for more efficiently removing or recovering metals from aqueous solutions.

To achieve the foregoing and other objects, and in accordance with the purposes of the present invention as embodied and broadly described herein, the method of this invention may involve passing an aqueous solution, which contains dissolved or suspended metals (e.g., gold, silver, iron, aluminum, platinum, uranium, etc.) through a very high voltage electric field accompanied by a very small trickle current charge. The high voltage electric field in combination with the trickle current alters the characteristics of the dissolved metals—possibly causing the metal ions or atoms to polarize, adsorb, agglomerate, or otherwise group together—so that they will be more susceptible to being captured and retained by adsorption or ion exchange on a mechanical trapping by a filter medium.

The process of the present invention is not electrolytic deposition, i.e., it is not an electrolytic process in which metal ions in the aqueous solution carry an electric current between an anode and a cathode and are deposited on the cathode. On the contrary, the metal ions in this invention do not carry a current and do not deposit on either of the high voltage electrodes. Instead, as explained above, the metal is collected by ion exchange or adsorption on or a mechanical removal by one or more filter media downstream from the electrodes. Therefore, the high voltage field, assisted by a small trickle current, causes the metal ions in the aqueous solution to come out of solution, possibly by forming into suspended solids in the water, or to undergo some other positive ion change that makes them more susceptible to adsorption or other filtering, which can be removed by conventional, non-electrical, filtration. Unlike electrolysis, one of the pair of high voltage electrodes used in this invention is insulated, so there is virtually no current flow in the process, except for the small trickle current as will be explained below, so electric power consumption is very low—making this process very economical for recovery of metals from aqueous solutions.

The apparatus of this invention may include an inner electrode deposed within an outer electrode which may be a grounded stainless steel tube, contained within a plastic tube through which metal-bearing water is passed. A high voltage electric field is established between the two electrodes and the metal-bearing water passes between the electrodes and through the high voltage electric field. A trickle current is applied directly to the water within the electric field. One of the electrodes may be electrically insulated and sealed from the water to minimize the electrical current flowing through the treatment chamber and to prevent electroplating. After flowing past the electrodes and the electric field, the water flows through at least one filter and optionally through a holding tank containing a buffering solution. Dissolved or suspended metals are extracted from the water and are collected on the various filters selected specifically to attract a certain metal or group of metals. These collected metals may then be disposed of or reused.

BRIEF DESCRIPTION OF THE DRAWINGS

The accompanying drawings, which are incorporated in and form a part of the specification, illustrate the preferred embodiments of the present invention, and together with the written description and claims, serve to explain the principles of the invention. In the drawings:

DETAILED DESCRIPTION OF THE PREFERRED EMBODIMENTS

Figure 1:
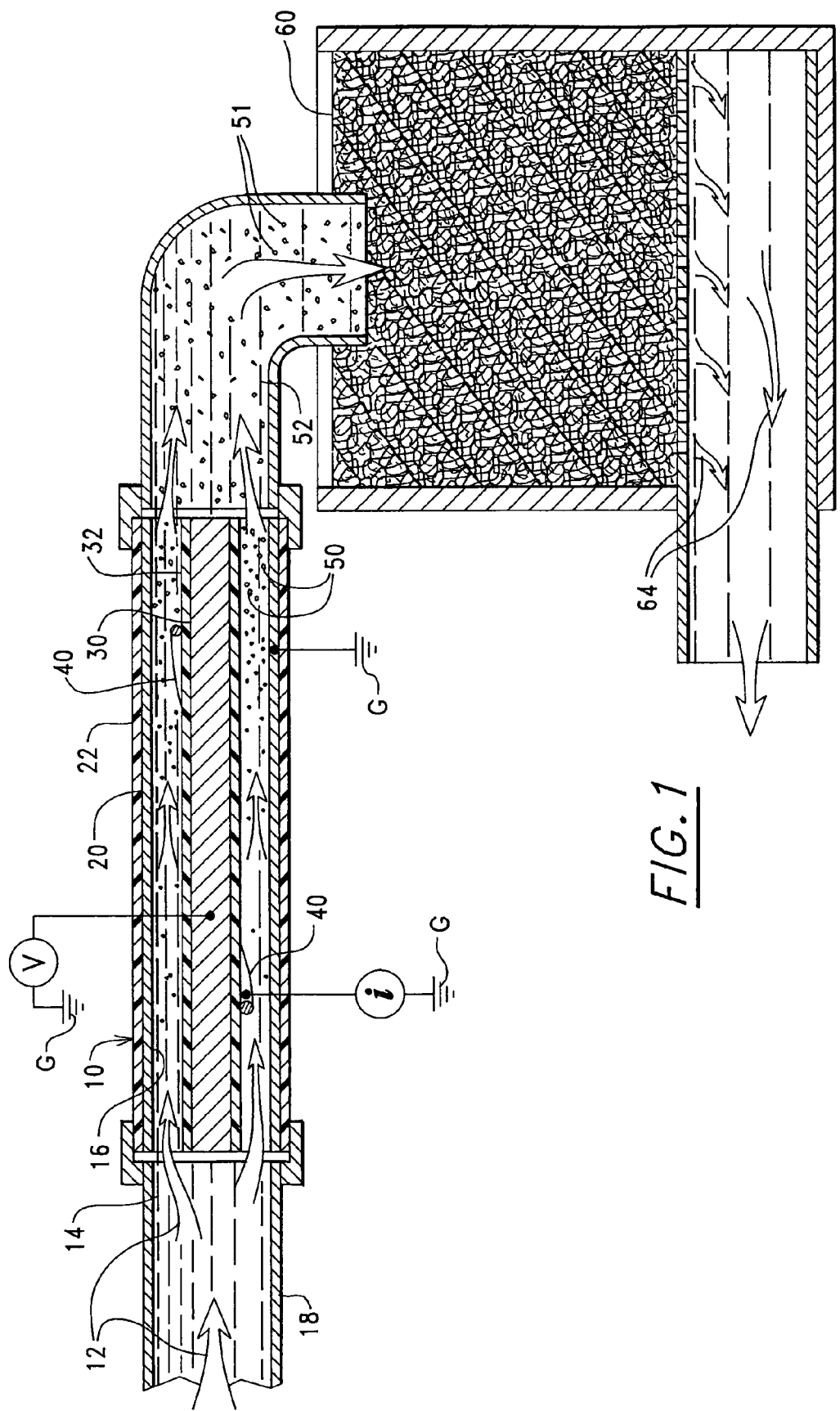
FIG. 1 is a cross-sectional diagrammatic view of the dissolved metal extractor apparatus of the present invention.
Figure 2:
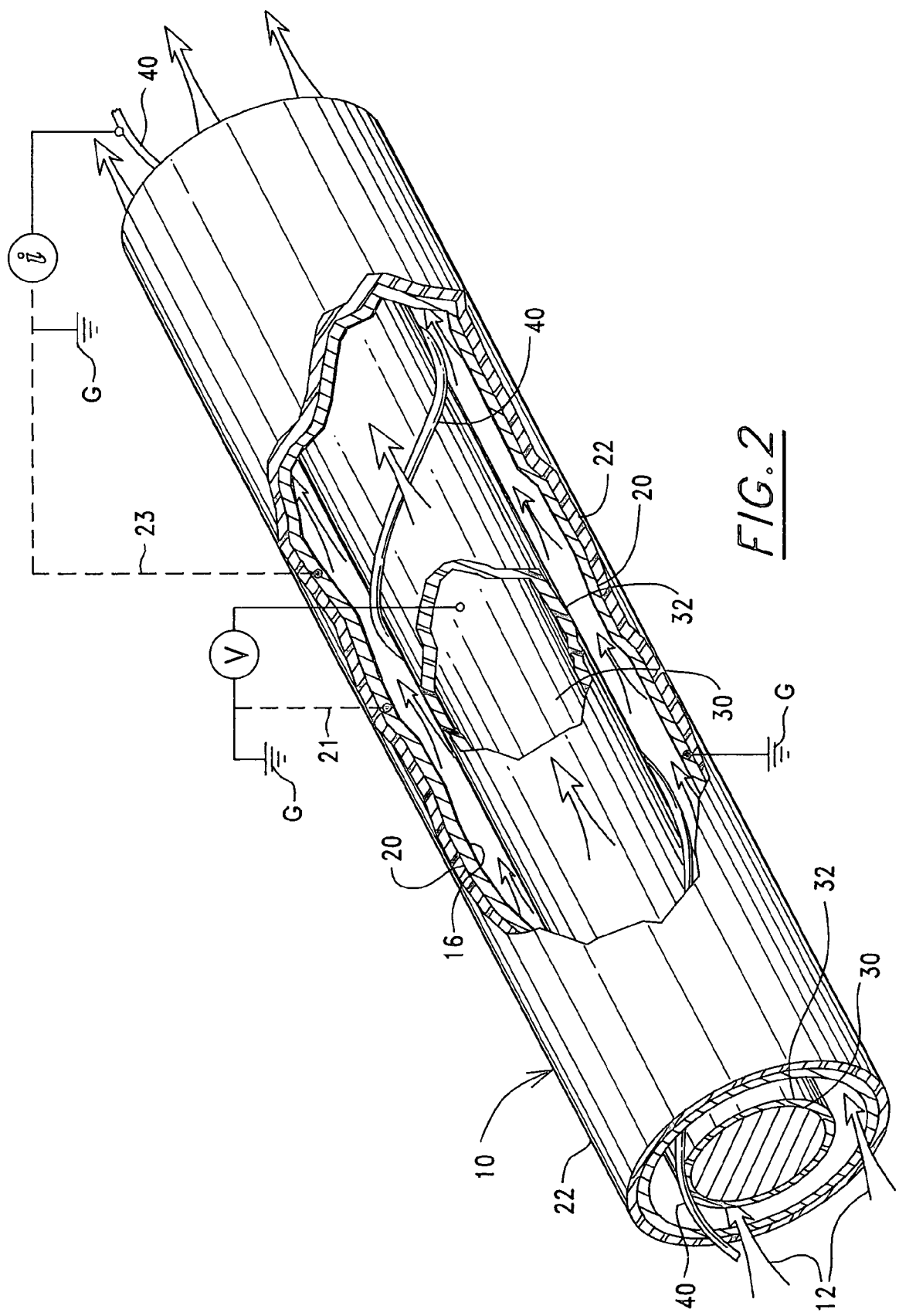
FIG. 2 is an isometric view of the high-voltage treatment chamber of the present invention with portions cut away to reveal various structures and features of the chamber.

The diagrammatic views in the enclosed FIGS. 1 and 2 illustrate the concepts and functions of the trickle charge stimulated adsorption, exchange, or agglomeration feature of the invention, which can be performed by many different structural embodiments, such as concentric tubular conduit/ electrodes, parallel plate/electrodes, and other arrangements that can provide a high voltage electric field across a metal-containing solution while exposing the solution to a trickle current. The preferred embodiment 10 of the high voltage/ trickle current enhances polarization, ion exchange, adsorption, or agglomeration of dissolved metals for easier removal from aqueous solutions according to this invention is shown in FIGS. 1 and 2. As will be explained below, the mechanics or physics of this invention on the atomic level are not known for certain, so it is possible that later research and analysis could reveal that some mechanism other than, or in addition to, polarization, ion exchange, adsorption, or agglomeration of metal ions or particles in the aqueous solution is responsible for the substantially enhanced filterability or removeability of the suspended or dissolved metals and metal ions when treated with the high voltage and trickle current according to this invention. Therefore, for convenience, the term "charge-altered condition" will be used to generally describe the results of the high voltage and trickle current treatment of suspended or dissolved metals in aqueous solution that makes them more amenable to removal from the solution by filtering, adsorption, or other removal mechanisms. Likewise, some of the metal atoms may be suspended in the water and some may be ions dissolved in the water. For convenience, the terms "metal ions" and "aqueous solution" are used herein, but with the intent that they include other atomic forms and mixtures that hold or sustain the metals in the water.

As shown by the flow arrows 12 in FIG. 1, an aqueous solution 14 comprising metal ions dissolved or suspended in water flows from a feed pipe 18 into a space 16 between two elongated electrodes 20, 30 of a high voltage/trickle current treatment chamber 10. A high voltage V is applied to one electrode 30, while the other electrode 20 is at ground G or common potential, thereby creating a high voltage electric field between the two electrodes 20, 30, so that the solution 14 flowing through the annular space 16 is exposed to the high voltage electric field between the two electrodes 20, 30. However, a layer of insulation 32 on the surface of electrode 30 prevents any current flow between electrodes 20, 30. Therefore, there is no electrolysis in the solution 14 as it passes through the annular space 16, thus there is also no deposition of the metal on either of the electrodes 20, 30. As would be understood by persons skilled in the art, the polarities of the electrodes 20, 30 could be reversed, so that electrode 20 is connected to the high voltage and electrode 30 is at ground G or common to produce the high-voltage electric field between the electrodes 20, 30. Of course, instead of having the electrode 20 at ground, it could be connected at opposite polarity to the high voltage V source or generator, as indicated by the phantom line 21 in FIG. 2, as would be understood by persons skilled in the art. The high-voltage electric field could also be created in other ways, as would also be understood by persons skilled in the art. Of course, the insulation 32 could be applied to the electrode inside surface of electrode 20 instead of to electrode 30 to prevent current flow between electrodes 20, 30, as would be understood by persons skilled in the art.

The outer layer of insulation 22 on outer electrode 20 is optional, but can be provided for safety and to protect the outer electrode 20 from damage. The outer insulation 22 can be, for example, a plastic tube or pipe in the nature of a sleeve with the outer electrode 20 positioned within.

A trickle current i is provided through a bare electric conductor 40, such as a wire or foil strip, which is exposed to the solution 14. The bare electric conductor 40 is shown connected to the current i source and positioned adjacent the insulation 32 of electrode 30 so that the fluid flow 12 is between the conductor 40 and the grounded electrode 20. Therefore, the trickle current i will flow through the fluid 14 (FIG. 2), that flows, as indicated at 12, through the treatment chamber 10. Of course, other electrical connections, such as shown at phantom line 23 (FIG. 2), and other positions of conductor 40 can also provide the trickle current i through the solution 14 for purposes of this invention.

There is no electrodeposition of the metal ions from the solution 14. Tests to date have been done with an alternating current (AC), i.e., oscillating high voltage V and an AC trickle current i that is phase-coordinated (i.e., within twenty degrees) to the high voltage V. The combination of AC or oscillating high voltage and trickle current is believed to prevent electrodeposition from the trickle current on either the bare high voltage electrode 20 or on the bare trickle current conductor 40.

The combination of the high voltage V electric field between electrodes 20, 30 and the trickle current i through the bare conductor 40 causes the metal ions in the aqueous solution 14 to change in some other way, perhaps polarization, ion exchange, adsorption, or agglomeration to either become more susceptible to adsorption by filter media 60, such as manganese oxide or activated carbon, as will be described in more detail below, or sometimes even to coagulate and come out of solution to form suspended metal solids 50 in the aqueous carrier fluid 52. Whatever the mechanism, metals in charge-altered condition are illustrated diagrammatically at 50 in FIG. 1. This phenomenon is not yet understood fully, so whether the metal ions come out of solution and then are adsorbed, or whether they are adsorbed directly from the solution is somewhat speculative at this point, although it appears that the high voltage and trickle current treatment of this invention enhances adsorption and/or ion exchange in the filter medium 60. It is also likely that some of the metal ions or atoms come out of solution to form suspended metal solids 50 and that such suspended metal solids 50 may coagulate or otherwise form clumps or colloids 51 of metal atoms that are carried by the aqueous liquid 52 to a filter medium 60, such as a bed of granulated resin-based manganese oxide (known in the art as "green sands"), in which the metal solids 50 are adsorbed and removed from the aqueous liquid. Such coagulation or other solid formation may be enhanced by the AC high voltage field and/or AC trickle current. Regardless of the precise particle and/or charge physics, the effluent that flows out of the filter medium 60, as indicated by flow arrows 64, is the aqueous liquid (water) sans nearly all of the metal ions that were dissolved in the influent solution 14.

The process described above enables filtration and/or adsorption results that are significantly greater than those that are experienced using currently available adsorption techniques. The average number of moles adsorbed using the disclosed apparatus and process of this invention is approximately twice the number absorbed without the high-voltage field and trickle charge, and the adsorption rate is approximately twice as fast. In other words, the removal of metals from aqueous solutions is much more efficient with this invention than with other available techniques.

Generally, the filter medium 60 can be removed and cleaned by well-known methods to recover the metal solids, which are adsorbed or caught and retained by the filter medium 60.

Figure 4:
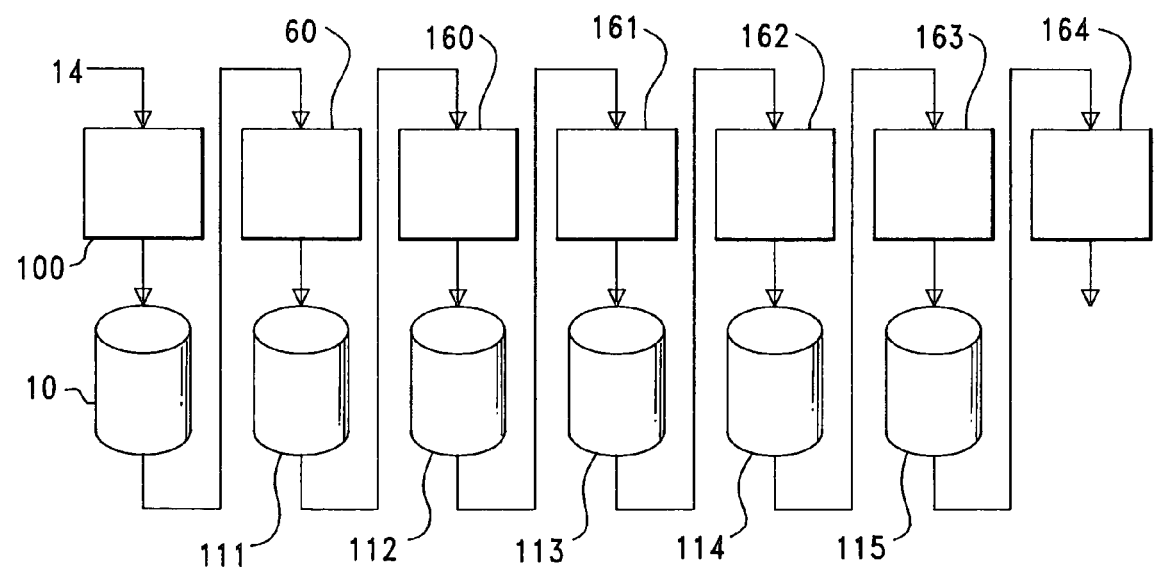
FIG. 4 is a system schematic flow diagram illustrating one set of steps in the process of extracting dissolved metals utilizing the apparatus of FIGS. 1 and 2.

While not shown specifically in FIG. 1, but further illustrated schematically in FIG. 4, a plurality of filter media 60, 160, 161, 162, 163, 164, such as beds of granulated or beaded activated carbon to further adsorb additional metal particles followed or preceded by sand filtration to remove other suspended solids, can be used in the process of this invention. Other filtration or adsorption media can also be used, as well as other filtration process variations depending on the metals being removed, as will be explained in more detail below.

Referring again to FIGS. 1 and 2, the high voltage V between the electrodes 20, 30 can be any magnitude greater than about 500 volts, preferably in a range between about 500 and 6,000 volts, and more preferably about 5,000 volts. The trickle current i in conductor 40 can be as little as a few (e.g., about 0.5 to 3.0) milliamps, and voltage on the conductor 40 is not significant. If the voltage V is provided by an alternating (AC) source, it is preferred that the trickle current i also be AC and nearly (within about 20°) in phase with the high voltage V. Tests, which will be discussed further below, have shown that over 99% of the metal, such as gold, etc., is consistently removable from the aqueous solution 14 by this process with very little electric power consumption.

Figure 3:
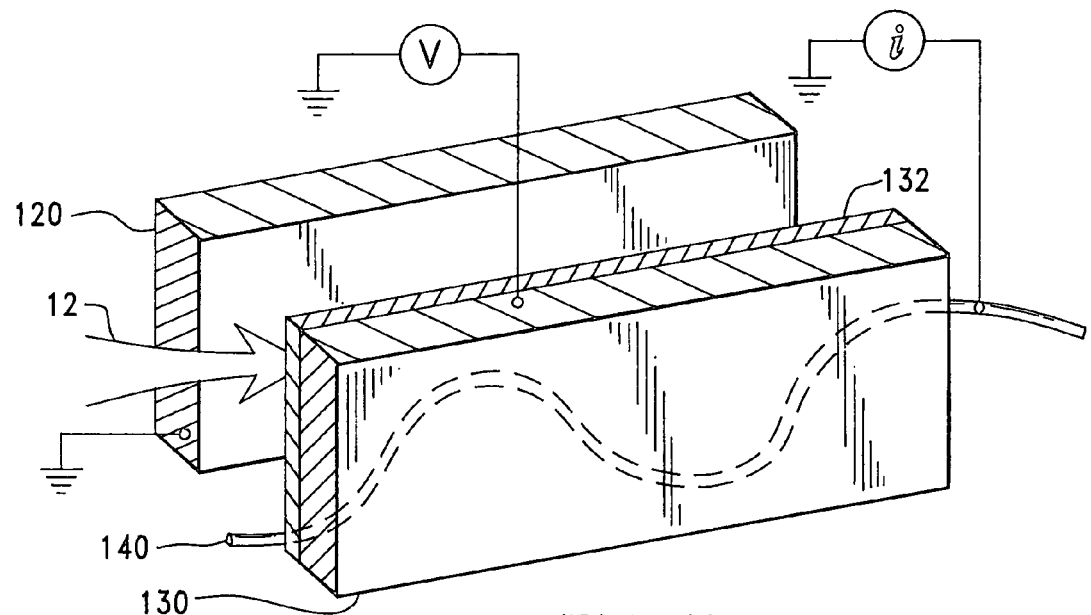
FIG. 3 is an alternate embodiment of the present invention illustrating an additional configuration whereby an electric field is created by parallel plates instead of tubular electrodes.

An example, but certainly not the only, structure of a metal recovery high voltage treatment chamber 10 according to this invention is shown in FIG. 2. The center electrode 30 is shown as a solid, elongated rod, but it could be hollow, especially if it is desired to have a larger diameter annular space 16 but not to have the additional material mass that would be required for a larger diameter, solid center electrode 30. The outer electrode 20 could be covered on its exterior surface with an insulation material (not shown), or it could be inserted inside an outer sleeve or pipe (not shown). On the other hand, the space 16 of the high voltage chamber 10 does not have to be annular. For example, the solution 14 could instead flow as indicated at 12 in FIG. 3 between parallel, rectangular, insulated, plate electrodes 120, 130 with an insulation layer 132 on electrode 130 to prevent current flow between electrodes 120, 130. A trickle current conductor 140 is positioned so that the insulation layer 132 is between the electrode 130 and the conductor 140 and, preferably, so that there is space for the fluid flow 12 between the conductor 140 and the uninsulated electrode 120, as shown in FIG. 3. Any other configuration that provides a trickle current i through the aqueous solution 14 as it is exposed to the high-voltage electric field would also work for purposes of this invention. While the preferred embodiment of the treatment chamber 10 is made of PVC and the electrode 20 is made of stainless steel and the electrode 30 is made of copper, the materials with which the disclosed apparatus is made is not particularly limited, and can be any such material that houses two electrodes 20, 30 spaced to allow the aqueous solution 14 to flow between them and able to withstand repeated exposure to the high-voltage electric field. For example, if plastic is used for the treatment chamber 10, it would preferably have dielectric properties, so that it will not eventually become electrically porous through repeated exposure to the high-voltage electric field.

While a single pass through the treatment chamber 10 and the filter medium 60 can be very effective to enhance extraction of a metal from a target solution 14, the process and apparatus of this invention is also capable of extracting numerous metals even more effectively through subsequent treatments involving a plurality of treatment chambers 10 and a plurality of filter media 60. With reference to FIG. 4, a process by which additional metals may be extracted more effectively may comprise generally flowing an initial volume of target solution 14 comprising the metals dissolved in water from a holding tank 100 through a first high-voltage/trickle charge treatment chamber 10, as discussed in the preceding paragraphs, followed by subsequent exposure of the treated target solution 14 to a filter medium 60, which may be, for example, an iron deposition material such as scrap iron, followed by an additional flow through a subsequent treatment chamber 111. For purposes of this description, subsequent treatment chambers 111, 112, 113, 114, 115, etc., can be configured the same as the treatment chamber 10 described above, unless specified otherwise. In one example, after treatment of the solution 14 to a high-voltage electric field and trickle charge in treatment chamber 10, it flows through a buffering media 60, such as limestone, in order to reduce the acidity of the solution 14, and then repeating high-voltage and trickle charge treatments while: (1) optionally altering the type of filter media 160, 161, 162, 163, 164 selected to extract specific target metals; and/or (2) optionally altering the flow rates of the fluid 14, thus varying the residence time that a particular volume of target solution 14 is exposed to the high voltage/trickle charge treatment in chambers 10, 111, 112, 113, 113, 115 and/or to each filter media 60, 160, 161, 162, 163, 164. It is often beneficial to provide a buffer material at 10 to increase the generally acidic pH level of the aqueous solution 14 in order to more efficiently target groups of metals in subsequent treatment chambers 111, 112, 113, 114, 115 and subsequent filter media 161, 162, 163, 164.

While a variety of filter media can be selected to target extraction of specific metals, the residence time within the treatment chamber 10 is also important. Referring again to FIGS. 1 and 2, the target solution 14 flows through the treatment chamber 10 at a flow rate that is selected to provide a desired residence or dwell time for the solution 14 to be exposed simultaneously to the high voltage electric field and trickle current. The dwell time should be sufficient for the simultaneous exposure of the solution to the high voltage electric field and trickle charge to cause the charge-changed condition of the dissolved or suspended metals, as described above. If the flow rate is too high, several passes of the solution 14 through the treatment chamber 10 may be necessary, or, alternatively, a treatment chamber 10 with a greater volume, e.g., longer an/or larger diameter, might be needed to expose the metals in the solution to the high voltage electric field V and trickle charge i simultaneously and long enough so that, when they pass through the filter media 60, they will be adsorbed or otherwise attach to the media as elemental, or native metals. In the preferred embodiment, the dwell time or residence time of the solution 14 being exposed to the high voltage and trickle current in treatment chamber 10 is in a range of about 2 minutes to about two hours. For example, in a treatment chamber 10 that is approximately 24 inches in length, and has an inner diameter of the outer electrode 20 of about 3.0 inches and an outer diameter of the inner electrode 30 of about 1.25 inches, a flow rate of about 1.0 to 120.0 liters per hour would provide a residence time of exposure to the high voltage V and trickle current i of about 2.0 minutes to about 2.0 hours. The residence times and the physical dimensions of the treatment chamber 10 described above are shown for illustration only, and are not meant to be limiting. Various structural changes to the treatment chamber 10 would change the residence times accordingly (e.g., the change in length of the treatment chamber or the change in the amount of annular space between inner 30 and outer electrodes 20 would increase or decrease the length of residence time within the treatment chamber 10 for a particular flow rate.

Referring again to the multiple-pass process illustrated in FIG. 4, an example aqueous solution 14 comprising dissolved or suspended copper, iron, and zinc may undergo a first round of metal extraction and recovery utilizing a filter comprised of scrap iron 60 after an initial pass of the solution 14 through treatment chamber 10, which will collect, by adsorption, ion exchange, or other physical chemical process a high percentage of the dissolved or suspended copper, iron and zinc from the target solution 14. A subsequent round of high voltage V and trickle current i treatment and metal extraction might involve flowing the target solution 14 through a second treatment chamber 111, which is similar to treatment chamber 10, followed by flowing the target solution 14 through a buffering material 160, such as a bed of limestone. During its residence time in the buffering material 160, the target solution 14 can be aerated, which increases the reaction of the acidic water 14 with the calcium carbonate of the limestone or lime, thus increasing the pH of the target solution 14 from about 5.0 to about 7.0 and reducing the scaling build-up that can occur on the buffering material 160. Next, the target solution 14 may flow through a third treatment chamber 112, which is also similar to treatment chamber 10, followed by flowing the target solution 14 through another filter medium 161 comprising steel wool. The filtering step 161 may be optional, depending on the objective of the process, which will be discussed in more detail below, and the filtering material 161 may be some other material, depending on the objective of the process, which will also be discussed in more detail below. It is often desirable for the first filtering step 60 to be iron, which gives up iron ions to the solution, thus increases metal ion concentration in the solution, which makes it easier to extract ions of metals other than iron, such as gold or zinc, etc., as will be explained in more detail below.

Subsequently, the target solution 14 can be passed sequentially through a fourth treatment chamber 113, that is also similar to treatment chamber 10, then through a $MnO_2$ filter 162 and/or an activated carbon filter 163, which may or may not be preceded by a pass through a fifth treatment chamber 114, that is similar to treatment chamber 10. After passing through the activated carbon filter 163, the solution 14 then can be passed through a sixth treatment chamber 115, which is the equivalent of treatment chamber 10, and finally, in this example, through a sand filter 164 prior to its ultimate discharge. The $MnO_2$ filter 162 in this example specifically targets the removal of non-heavy or non-precious metals (known in the art as base metals) from the target solution 14, while the activated carbon filter 163 specifically targets the removal of heavier or precious metals, such as lead, gold, uranium, copper and silver from the target solution 14 through adsorption, ion exchange or other process. The sand filter 164 in this example specifically targets the removal of colloidal clays and other suspended solids from the target solution 14. Optionally, an additional equivalent treatment chamber (not shown) can be added or substituted in combination with a filter (not shown) for the effective removal of nearly all nitrates and about one-half of all sulfates. For example, such a filter (not shown) could be made of an organic medium, such as organic coating clays, which removes nitrates and sulfates by adsorption. Additionally, selenium can be effectively removed through the addition of lanthanum chloride by adsorption or other surface effects on carbon. In general, all of the various filters that can be potentially selected may be of common variety that are well-known to persons skilled in the art, and it is expected that new metal filtration or extraction techniques may be developed in the future for use with the high voltage/trickle current treatment of this invention. Iron or steel wool filters are consumed by the disclosed process, but the iron is then taken out of solution by the $MnO_2$ filter 162, as $MnO_2$ resin filters 162 are specifically designed to adsorb iron. $MnO_2$ filters 162 are also eventually consumed, probably due to the exchange of manganese for some other metal (e.g., iron), but the manganese is subsequently removed by the carbon filter 163, which is designed so that manganese is adsorbed on the carbon.

Example results from various test protocols and field experiments are reproduced below in order to illustrate the efficiency with which the apparatus and process of this invention produce the low-cost extraction of a variety of dissolved metals from target solutions.

First Set of Data

Tests were conducted using the apparatus and the process described above on typical acid rock drainage water drawn from active mines as illustrated in Table 1 below:

| Test | Source | Amount |
| --- | --- | --- |
| A | Peru | 30 gallons |
| B | Indonesia | 30 gallons |
| C | Nevada | 50 gallons |
| D | Idaho | (large scale) |
| E | Idaho 2 | 20 gallons |
| F | Colorado | >1,000 gallons |
| G | Domestic | >100 gallons |

From the seven source mines, samples of acid rock drainage water were tested for metallic content, and passed through the treatment chamber and filter media combination. Representative results from the seven tests run are shown in the Table 2 below:

| Metal Ion | Feed (ppm) | Discharge (ppm) | Percent Removed | Critical Limit | Drinking $H_2O$ Stnd. | Source |
| --- | --- | --- | --- | --- | --- | --- |
| Aluminum | 112.2300 | 0.05 | 99.9 | ND | 2.000 | B Indonesia |
| Antimony | 0.0120 | 0.00 | 83.3 | 0.005 | 0.010 | A Peru |
| Arsenic | 3.8440 | <0.01 | >99.9 | 0.050 | 0.050 | C Nevada |
| Barium | 0.2200 | 0.01 | 93.6 | 2.00 | | B Indonesia |
| Beryllium | 0.0750 | <0.0001 | >99.99 | 0.004 | | C Nevada |
| Cadmium | 0.3400 | 0.01 | 98.5 | 0.005 | | A Peru |
| Chromium | 0.8100 | <0.003 | >99.63 | 0.100 | | C Nevada |
| Cobalt | 0.7870 | 0.04 | 95.5 | 0.750 | | B Indonesia |

-continued

| Metal Ion | Feed (ppm) | Discharge (ppm) | Percent Removed | Critical Limit | Drinking $H_2O$ Stnd. | Source |
|---|---|---|---|---|---|---|
| Copper | 34.4600 | 0.01 | 99.9 | 1.30 | | B Indonesia |
| Iron | 101.6800 | 0.03 | 99.9 | | 0.300 | B Indonesia |
| Lead | 0.3860 | 0.00 | 96.8 | 0.015 | | D Idaho 1 |
| Magnesium | 36.1740 | 17.11 | 52.7 | 150.000 | 0.300 | B Indonesia |
| Manganese | 0.9530 | 0.01 | 98.5 | 0.050 | | E Idaho 2 |
| Mercury | 0.0015 | 0.00 | 60.0 | 0.002 | | G Domestic |
| Molybdenum | 0.1620 | 0.00 | 98.1 | 3.000 | | B Indonesia |
| Nickel | 9.6910 | 0.42 | 95.6 | 0.100 | | C Nevada |
| Phosphorus | 4.9920 | 0.01 | 99.9 | ND | | A Peru |
| Selenium | 0.0410 | 0.03 | 34.1 | 0.050 | | D Idaho 1 |
| Sodium | 54.8990 | <0.008 | 99.9 | 20.000 | | C Nevada |
| Sulfur | 459.4730 | 279.98 | 39.0 | ND | | B Indonesia |
| Thallium | 0.0960 | <0.006 | >93.75 | 0.002 | | D Idaho 1 |
| Vanadium | 89.0000 | 7.44 | 91.6 | ND | | D Idaho 1 |
| Zinc | 19.4600 | 0.64 | 92.4 | 0.500 | 5.0 | B Indonesia |

In each case, the apparatus and process disclosed in this invention reduced the concentration of the dissolved or suspended metal ions to at, or near, EPA discharge standards (Critical Limits), or to at, or near, drinking water standards (if discharge standards were not delineated).

In addition, laboratory tests were run on a separate sample of water taken from a uranium mine. The sample water initially contained significant levels of both selenium and uranium. When passed through the treatment chamber and filter media combination disclosed above, however, significant reductions in both uranium and selenium content resulted as is illustrated below in Table 3:

| Element | Feed | Discharge | U.S.A. Limit |
|---|---|---|---|
| Selenium (ppm) | 0.492 | 0.098 | 0.05 |
| Uranium (pCi/L) | 6010.0 | 8.1 | 3385.0 |

Although the apparatus and process disclosed in this invention removed approximately 80% of the dissolved selenium, it did not bring it under federal discharge limits. However, subsequent testing has shown that with the addition of trace amounts of certain reagents to the input stream, such as lanthanum chloride, the apparatus and process will effectively reduce selenium to concentrations under the federal discharge limits.

While it is necessary to use limestone to buffer some of the samples with lower pH levels as explained above, the amount of limestone consumed was quite low (e.g., the amount used to buffer the acid rock drainage from the Nevada Mine and to raise the pH from about 1.5 to a pH of about 7 was approximately one-tenth of the amount of calcium ion consumption that the mine itself uses to raise the pH to approximately 5). The process disclosed above sometimes requires low concentrations of additional reagents (small amounts of iron, lime, and in some cases lanthanum chloride) in order to effectively extract certain metals, which may raise the cost of extraction slightly. In general, however, the invention yields exceptional extraction results for a nominal cost relative to existing technologies.

Second Set of Data

Figure 5:
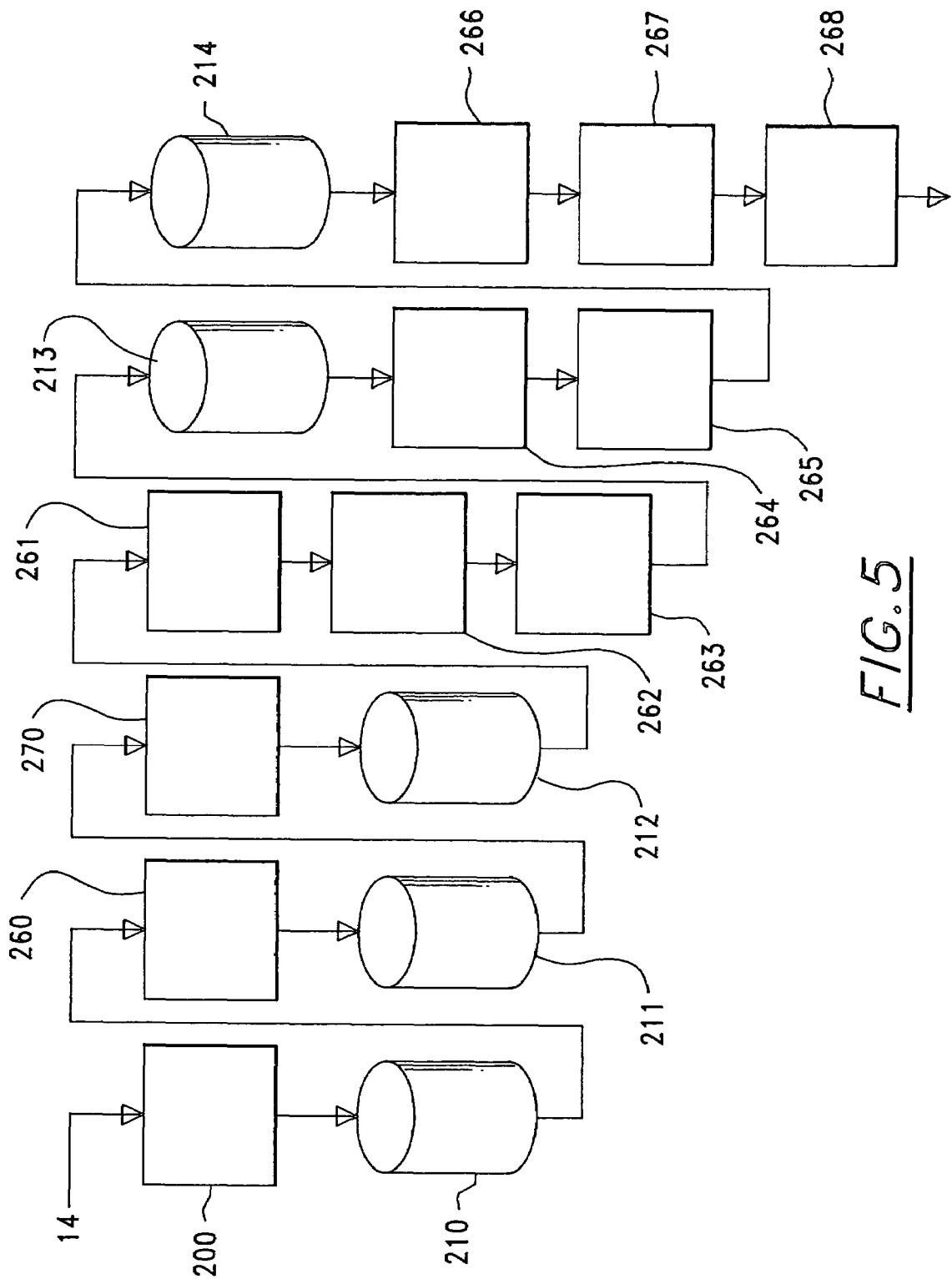
FIG. 5 is a system schematic flow diagram illustrating an alternate set of steps in the process of extracting dissolved metals utilizing the apparatus of FIGS. 1 and 2.

A second set of experiments was run using a 40 gallon sample of acid rock drainage from the now-abandoned Wellington/Oro mine in Summit County, Colo. The sample was analyzed for contaminants and then processed through the treatment chamber 10 and filtration process 60 disclosed above. The first test protocol, illustrated by the schematic shown in FIG. 5, followed the four-step process described below:

Pass 1: From head tank 200, solution 14 flows at 26.5 gallons/hour through a first treatment chamber 210 then through a steel wool filter 260 then through a second treatment chamber 211 and finally through a limestone treatment column 270 to a holding tank.

Pass 2: Solution 14 then flows at 9.36 gallons/hour through a third treatment chamber 212 then through a steel wool filter 261 then through a $MnO_2$ filter 262 and finally through a carbon filter 263 to a holding tank.

Pass 3: Solution 14 then flows at 5.0 gallons/hour through a fourth treatment chamber 213 then through a $MnO_2$ filter 264 then through a carbon filter 265 to a holding tank.

Pass 4: Solution 14 then flows at 20.3 gallons/hour through a fifth treatment chamber 214 then through a $MnO_2$ filter 266 then through a carbon filter 267 and finally through a sand filter 268 to discharge.

At this point, an additional (sixth) treatment chamber (not shown) could be placed in sequence with an additional activated carbon filter (not shown), in order to remove any residual arsenic and/or manganese.

In general, steel wool was used in the laboratory testing for the experimental purposes, but the system works well with any clean scrap iron. The steel wool is typically used when the pH of the water being tested is 4.0 or less. The need for using steel wool in the process is also dependant upon the amount, if any, of iron in the water being tested, and also by the amount of colloidal content of the test sample. For instance, if the water is very clear, additional suspended iron is needed, because iron is an important part of colloid formation and aides in adsorbing the ions. Specifically, copper is recovered from solution by an exchange with iron, which is known in the art as a cementation process in which the copper comes out of solution in an agglomeration or similar form that is easy to remove by mechanical filtration. The iron acts in this manner to replace the dissolved copper as well as about half of the dissolved zinc. Therefore, when the copper content is high, iron, such as steel wool or scrap iron should be used to deposit the copper and take up the iron. The steel wool used in testing was electrically neutral. Additionally, $MnO_2$ is used anytime there is a need to remove a majority of metals present because it is an excellent media for removing iron, and in this invention, it picks up almost all the metals. Essentially, manganese ions in the $MnO_2$ are replaced with the iron, which is then removed as iron oxide and in other forms. The manganese can then be removed with a carbon filter medium, as described above. The use of $MnO_2$ is not necessary, however, for heavy and precious metals, such as gold, copper, uranium, plutonium, silver and the platinum/palladium group which are more easily recovered using only a carbon filter. Nearly all of the nitrates present can be removed using an organic filter, such as BDL=s (Environmental Technologies) MS-5298CS series media (specifically the CS30 and CS31 series).

Figure 6:
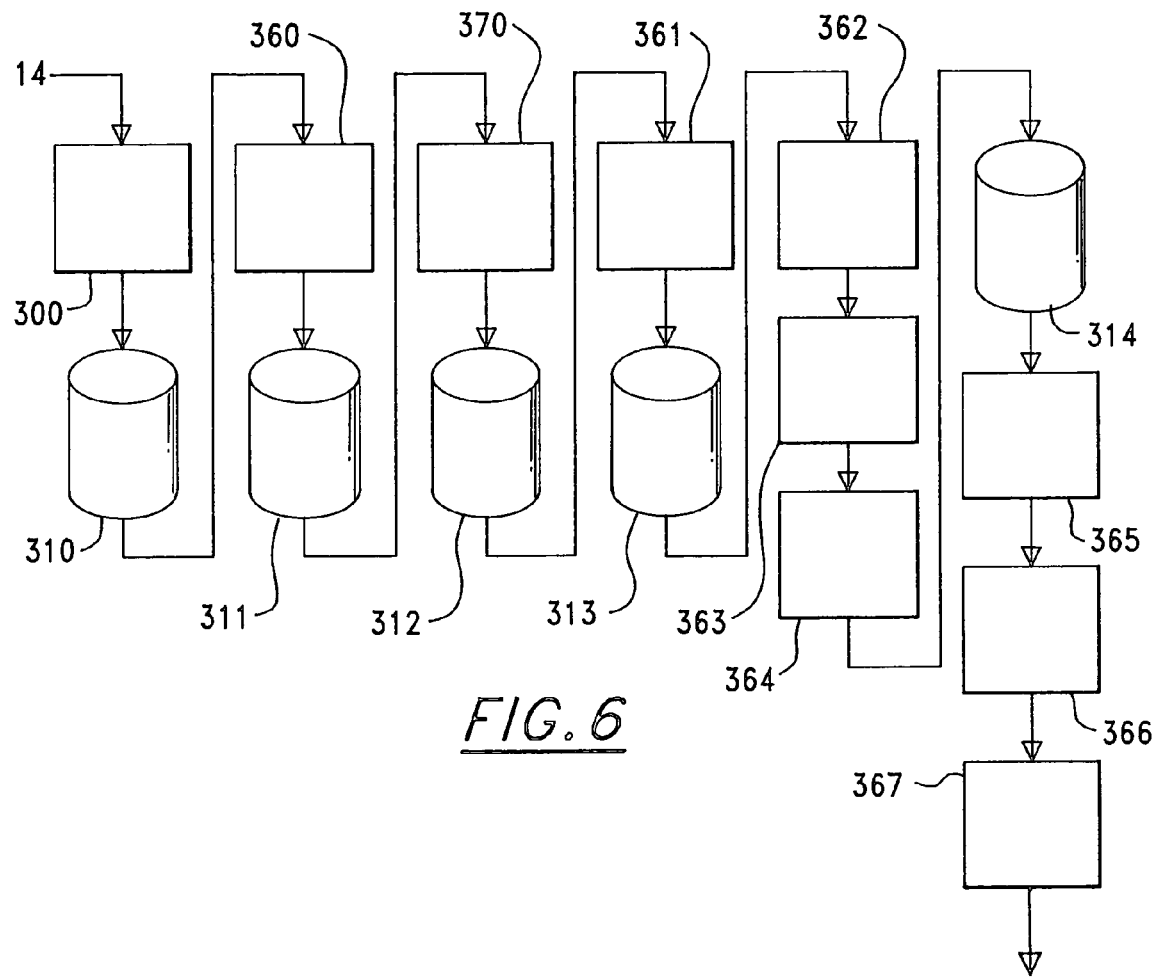
FIG. 6 is a system schematic flow diagram illustrating another alternate set of steps in the process of extracting dissolved metals utilizing the apparatus of FIGS. 1 and 2.

The second test protocol, illustrated by the schematic shown in FIG. 6, followed the four-step process described below:

Pass 1: From head tank 300, solution 14 flows at 26.4 gallons/hour through a first treatment chamber 310 then through a steel wool filter 360 then through a second treatment chamber 311 and finally through a limestone treatment column 370 to a holding tank.

Pass 2: Solution 14 then flows at 14.1 gallons/hour through a third treatment chamber 312 and then through a carbon filter 361 to a holding tank.

Pass 3: Solution 14 then flows at 5.0 gallons/hour through a fourth treatment chamber 313 then through a steel wool filter 362 then through a $MnO_2$ filter 363 and finally through a carbon filter 364 to a holding tank.

Pass 4: Solution 14 then flows at 28.1 gallons/hour through a fifth treatment chamber 314 then through a $MnO_2$ filter 365 than through a carbon filter 366 and finally through a sand filter 367 to discharge.

The results of the two test protocols are summarized in Table 4 below:

| Filter Media | Zinc Precip (Troy Oz) | Filter Media Wt (Troy Oz) | Zinc Recovered (%) | Media Wt (%) |
| --- | --- | --- | --- | --- |
| Steel Wool (1) | 0.0345 | 9.1 | 19.12 | 5.63 |
| Filter Paper (1) | 0.0005 | 0.0 | 0.28 | 0.02 |
| Steel Wool (2) | 0.0114 | 7.97 | 6.32 | 4.88 |
| Filter Paper (2) | 0.0002 | 0.0 | 0.11 | 0.02 |
| Birm (2) | 0.0794 | 22.86 | 44.01 | 14.00 |
| Carbon (2) | 0.0185 | 29.99 | 10.26 | 18.36 |
| Birm (1) | 0.0295 | 25.09 | 16.35 | 15.37 |
| Carbon (1) | 0.0060 | 28.86 | 3.33 | 17.68 |
| Sand (2) | 0.0004 | 39.24 | 0.22 | 24.01 |
| Total | 0.1804 | 163.26 | 100.00 | 100.00 |

To put these results in perspective, it has been estimated that the average output of the Wellington/Oro discharge is approximately 50 gallons/minute or 72,000 gallons per day. Thus, if 99% of the zinc was effectively removed, the saleable yield of recovered zinc would be about 50 pounds/day.

Third Set of Data

Figure 7:
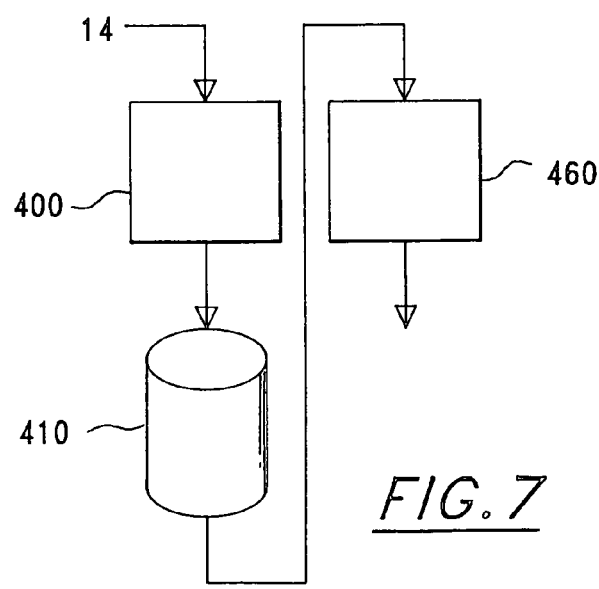
FIG. 7 is a system schematic flow diagram illustrating still another alternate set of steps in the process of extracting dissolved metals utilizing the apparatus of FIGS. 1 and 2.

Similarly, an experiment was conducted to determine the efficiency of gold and copper recovery using the apparatus and process disclosed above compared to the typical process of recovering gold through a typical carbon column without electric stimulation. The test protocol utilized, illustrated by the schematic shown in FIG. 7, is described below:

First Pass: From head tank 400, gold or copper pregnant solution (tap water doped with gold tetrachloride or water

| Test Point | Feed (EPA) µg/L | Feed (HM) µg/L | Discharge Test 1 µg/L | Discharge Test 2 µg/L | EPA Crit Concen µg/L |
| --- | --- | --- | --- | --- | --- |
| Aluminum | <10.0 | <10.0 | <10.0 | <10.0 | 50.0 |
| Arsenic | <4.0 | 6.0 | 4.0 | 4.0 | 3.0 |
| Barium | 8.60 | 8.0 | 14.0 | 11.0 | 2000.0 |
| Cadmium | 42.2 | 40.0 | <10.0 | <10.0 | 5.0 |
| Chromium | 14.0 | <10.0 | <10.0 | <10.0 | 100.0 |
| Cobalt | 98.0 | 323.0 | <5.0 | 41.0 | N/A |
| Copper | | 13.0 | <5.0 | 12.0 | 1,200.0 |
| Iron | 91,930.0 | 71,800.0 | 11.0 | 74.0 | 300.0 |
| Lead | 130.0 | 53.0 | <2.0 | <2.0 | N/A |
| Manganese | 34,400.0 | 33,800.0 | 435.0 | 3,260.0 | 50.0 |
| Molybdenum | 15.0 | N/A | <10.0 | <10.0 | N/A |
| Nickel | 90.5 | 98.0 | <10.0 | <10.0 | N/A |
| Selenium | 8.00 | <5.0 | <5.0 | <5.0 | 50.0 |
| Zinc | 99,210.0 | 88,000.0 | 10.0 | 100.0 | 5,000.0 |
| pH | | 5.96 | 9.03 | 8.75 | 5.0-8.5 |

Of all the elements identified and treated, only arsenic and manganese remain above either EPA critical concentration level or, if no such level exists, above drinking water standards. As discussed above, both arsenic and manganese can be brought within acceptable limits by adding an additional treatment chamber and filter. In both tests, the water became more alkaline than expected, but this is a variable that is easily adjusted through the use of additional buffering reagents.

Additionally, sludge and filter media used in the tests discussed above were collected to determine the percentage of the entrained zinc that could be recovered and how such recovery could be most efficiently facilitated. The results of these efforts are summarized in Table 5 below:

doped with cupric sulfate) 14 flows through a first treatment chamber 410 and then through a carbon column 460 to discharge.

The results from the test protocol are summarized in Table 6 below:

| Element | Feed (ppm) | Discharge (ppm) | Time of Operation | % Removed |
| --- | --- | --- | --- | --- |
| Gold | 2.201 | 0.108 | 4.5 hours | 95 |
| Gold | 2.266 | 0.647 | 20.2 hours | 70 |
| Gold | 1.942 | 0.971 | 45.5 hours | 50 |

-continued

| Element | Feed (ppm) | Discharge (ppm) | Time of Operation | % Removed |
|---|---|---|---|---|
| Gold | 1.942 | 0.971 | 54.5 hours | 50 |
| Copper | 2.152 | 0.534 | 4.5 hours | 75 |
| Copper | 2.227 | 1.977 | 20.2 hours | 12 |
| Copper | 1.648 | 1.383 | 45.5 hours | 16 |
| Copper | 1.664 | 1.414 | 54.5 hours | 15 |

Further, the method disclosed by this invention yields 36.3% of total dissolved Au extracted compared with only 29.3% of total dissolved Au extracted using a carbon filtration only process. Additionally, 27.7 ounces of gold per ton of carbon collected using the method disclosed in this invention versus 23.22 ounces of gold per ton of carbon collected using the carbon filtration only process. Thus, the amount of carbon required to filter and recover gold from solution is reduced from between 60% and 80%. Also, the time needed to expose the gold solution to the carbon column is likewise reduced. Further, the total amount of gold accumulated on a single carbon column is increased significantly. Finally, the amount of gold recovered on a single carbon column using the apparatus and process disclosed in this invention versus solely relying on the carbon column is between five and seven times greater. The end result is that by using the apparatus and process disclosed by this invention, the total gold collected after 54.5 hours was 153.72 ounces per ton of carbon.

Again referencing the schematic shown in FIG. 7, a second experiment was conducted using the same apparatus and process as described above but with the addition of cyanide in the solution. The experiment tested a 10 gallon sample of water from Phoenix, Ariz. treated with a cyanide solution such that the dissolved gold was 1.421 parts per million (ppm) and the cyanide was 262 ppm. The experiment was conducted by pumping 10 gallons of the water through treatment chamber 410 and a carbon column 460 containing 10 grams of carbon. The same process was then repeated using a similar carbon column containing 10 grams of carbon, but without first sending the water through a treatment chamber. The results are summarized in Table 7 below:

| | |
|---|---|
| Total HMC Au collected on C only column | 16.3511 ounces per ton of accumulated metal |
| Total HMC Au collected on C + treatment | 80.4485 opt |
| HMC Au accumulation increase w/treatment | 4.92 times |
| Total Au collected on C only column | 14.7232 opt |
| Total Au collected on C + treatment | 94.8183 opt |
| Au accumulation increase w/treatment | 6.44 times |
| Feed gold in solution (cyanide) | 0.933 ppm |
| Au contained on C column material b/f test | 0.0 opt |

Thus, the process disclosed in this invention shows a 10% increase in removal of gold from solution in the final composite solutions. Also, when comparing gold concentrations versus time, the process disclosed in the invention shows up to a 20% difference in gold removal efficiency in the first two hours of the test. Finally, the actual increase of gold on the carbon column using the process disclosed in this invention was 20%. The numeric increase was 152.168 ppm or 4.4388 opt greater than the 795.871 ppm on the control carbon only test column. Further results from this test are summarized in Table 8 below:

| Time | C only Au discharge | C only Au % removed | C + treatment Au discharge | C + treatment Au % removed |
|---|---|---|---|---|
| 0 | 0.429 | 69.8 | 0.412 | 71.0 |
| 5 | 0.776 | 45.4 | 0.487 | 65.7 |
| 10 | 0.778 | 45.2 | 0.526 | 63.0 |
| 15 | 0.773 | 45.6 | 0.543 | 61.8 |
| 30 | 0.801 | 43.6 | 0.709 | 50.1 |
| 60 | 0.915 | 35.6 | 0.804 | 43.4 |
| 120 | 0.964 | 32.1 | 0.953 | 32.9 |
| 192 | 0.908 | 36.1 | 1.018 | 28.4 |
| 240 | | | 1.082 | 23.9 |

The post-process concentrations of the dissolved gold using the invention process and apparatus are 0.905 ppm (36.3% removed) versus the post-process concentration of the dissolved gold using a carbon filter only of 1.004 ppm (or only 29.3% removed). Also, the amount of gold accumulated on the carbon using the invention process and apparatus is 948.039 ppm (or 27.7 opt) versus 795.87 ppm (or only 23.22 opt) for a carbon only removal system.

For example, the overriding principle of this invention is simultaneous exposure of the aqueous solution 14 to a high voltage electric field and a trickle current followed by filtration, as explained above. Persons skilled in the art can devise other structures and apparatus to implement this principle. For example, the electrode 30, 130 and insulation 32, 132 could be replaced with a semiconductor material formulated to accommodate a high voltage while allowing only a trickle current of the respective magnitudes discussed above to flow through the aqueous solution. For another example, the flow of aqueous solution between the two electrodes 20, 120 and 30, 130 could be positioned to not contact either of the two electrodes, such as by flowing the aqueous solution through a conduit (not shown) that is positioned between the two electrodes 20, 120 and 30, 130, and the trickle charge could be established between two conductors, e.g., conductor 40, 140 and another conductor (not shown), both of which are in contact with the solution in the conduit. For another example, the filter medium could also be positioned in at least part of the high voltage electric field instead of down stream from it. These and other alternatives would be considered equivalents for implementing the principles of this invention.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A process for removing at least one metal dissolved or suspended in an aqueous solution, the process comprising:
   a) providing an inner electrode and an outer electrode disposed within a chamber, positioned such that the aqueous solution may flow between the inner electrode and the outer electrode, wherein either the inner electrode or the outer electrode further comprises a layer of insulation that prevents any current flow between the inner and outer electrodes;

b) providing a voltage source across the inner electrode and the outer electrode to create an electrostatic field between the inner and outer electrodes;

c) providing a bare electric conductor between the inner electrode and connecting the bare electric conductor to a trickle current source to provide a trickle current directly to the aqueous solution;

d) providing a filter medium positioned downstream from, and in fluid communication with the chamber; and e) passing the aqueous solution between the inner electrode and the outer electrode at a flow rate that is sufficiently low enough to define a residence time of the aqueous solution within the chamber to sufficiently charge the dissolved or suspended metal, and then passing the aqueous solution through the filter medium.

2. The process of claim 1, wherein the voltage source of step b supplies an AC voltage across the inner electrode and the outer electrode in a range from between about 500 to about 6,000 volts.

3. The process of claim 2, wherein the voltage source of step b supplies the AC voltage across the inner electrode and the outer electrode of at about 5,000 volts.

4. The process of claim 2, wherein the bare electric conductor of step c supplies the trickle current directly to the aqueous solution in a range from between about 0.5 to about 3.0 milliamps that is phase-coordinated with the AC voltage.

5. The process of claim 4, wherein the flow rate of step e is alterable to increase or to decrease the residence time that the aqueous solution spends within the chamber depending on which metal is dissolved or suspended in the aqueous solution.

6. The process of claim 5, wherein the filter medium of step e can be altered depending on which metal is dissolved or suspended in the aqueous solution.

7. The process of claim 6, wherein steps a through e are repeated.

8. A process for adsorbing at least one metal dissolved or suspended in an aqueous solution, the process comprising:

a) providing an inner electrode and an outer electrode disposed within a chamber, positioned such that the aqueous solution may flow between the inner electrode and the outer electrode, wherein either the inner electrode or the outer electrode further comprises a layer of insulation that prevents any current flow between the inner and outer electrodes;

b) providing a voltage source across the inner electrode and the outer electrode to create an electrostatic field between the inner and outer electrodes, wherein the voltage source supplies an AC voltage across the inner electrode and the outer electrode ranging from between about 500 to about 6,000 volts;

c) providing a bare electric conductor between the inner electrode and the outer electrode and connecting the bare electric conductor to an AC trickle current source to provide a trickle current directly to the aqueous solution, wherein the AC trickle current source and the electric conductor supply an AC trickle current directly to the aqueous solution ranging from about between about 0.5 to 3.0 milliamps that is further phase-coordinated with the AC voltage;

d) providing a filter medium positioned downstream from, and in fluid communication with the chamber, whereby the filter medium is capable of extracting the dissolved or suspended metal from the aqueous solution through adsorption; and e) passing the aqueous solution between the inner electrode and the outer electrode in contact with the bare electric conductor at a flow rate that is sufficiently low enough to define a residence time of the aqueous solution within the chamber to sufficiently charge the dissolved or suspended metal, and then passing the aqueous solution through the filter medium.

9. A method of removing a metal from an aqueous solution, comprising:

a) exposing the aqueous solution to a high voltage electric field between a first electrode that is not insulated to the solution and a second electrode that is insulated from the aqueous solution to prevent any current flow between the first and second electrodes, and to a bare trickle current conductor that provides a trickle current to the aqueous solution simultaneously with the high voltage electric field; and b) passing the aqueous solution that has been exposed to the high voltage electric field and trickle current through a filter medium to remove the metal.

10. The method of claim 9, wherein the high voltage electric filed is at least 500 volts.

11. The method of claim 9, wherein the trickle current is at least 0.5 mA.

12. The method of claim 9, wherein the filter medium removes the metal from the aqueous solution by adsorption.

13. The method of claim 9, wherein the filter medium removes the metal from the aqueous solution by ion exchange with another metal.

14. The method of claim 9, wherein the filter medium removes the metal from the aqueous solution by mechanical trapping.

15. The method of claim 9, wherein the high voltage electric field is AC.

16. The method of claim 9, wherein the trickle current is AC.

17. The method of claim 9, wherein both the high voltage electric field and the trickle current are AC.

18. The method of claim 17, wherein the AC high voltage electric field and the AC trickle current are phase-coordinated with each other.

* * * * *